UNITED STATES PATENT OFFICE.

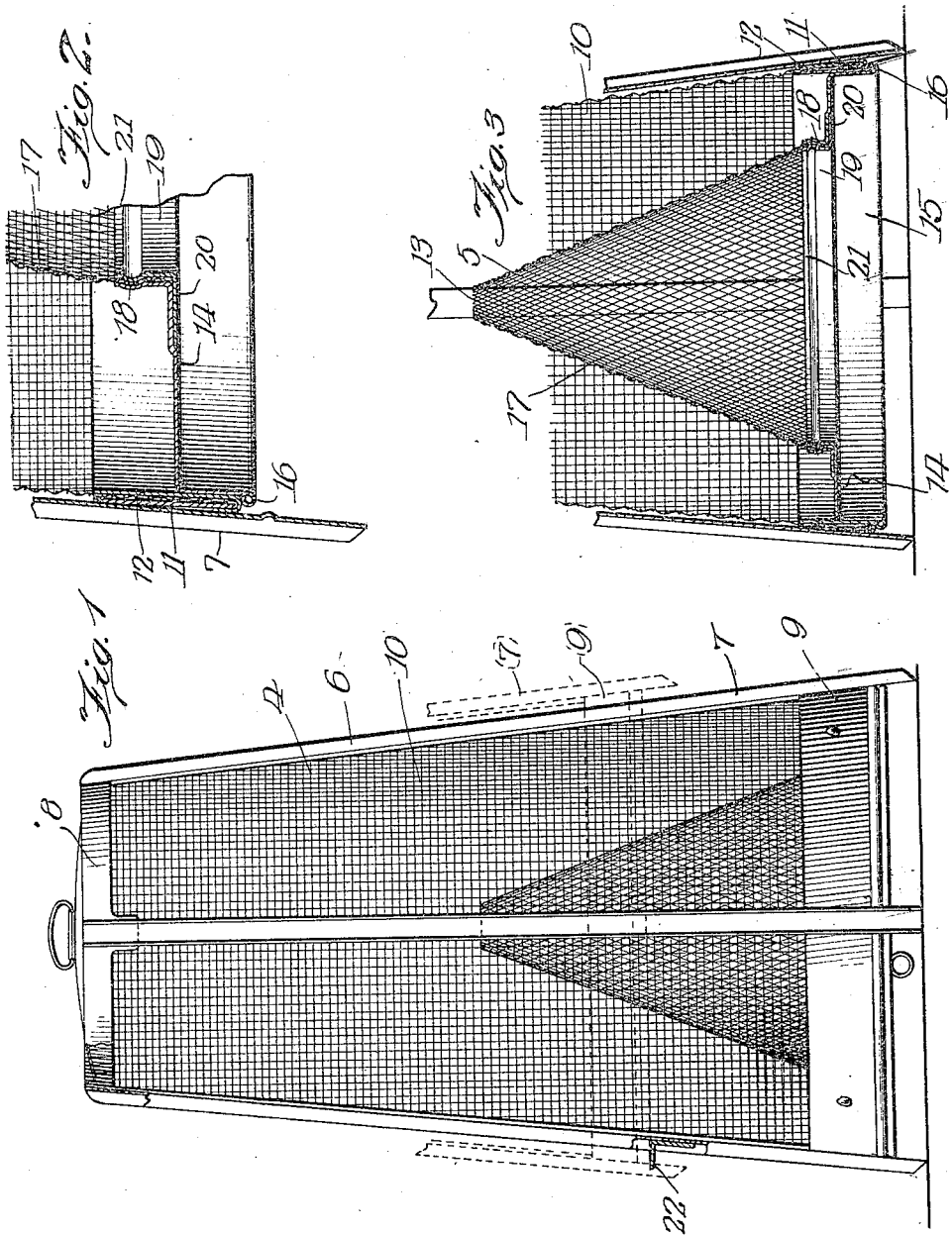

CHARLES STOLLBERG, OF TOLEDO, OHIO, ASSIGNOR TO AMERICAN CAN COMPANY, OF NEW YORK, N. Y., A CORPORATION OF NEW JERSEY.

FLY-TRAP.

1,284,810.　　　　　Specification of Letters Patent.　　Patented Nov. 12, 1918.

Application filed March 8, 1915. Serial No. 12,730.

*To all whom it may concern:*

Be it known that I, CHARLES STOLLBERG, a citizen of the United States, residing in Toledo, in the county of Lucas and State of Ohio, have invented a new and useful Improvement in Fly-Traps, of which the following is a specification.

This invention relates in general to fly traps and more particularly to fly traps provided with an inner open-top screen cone and has for its aim particularly the provision of a fly trap of improved construction and one which will be better adapted for packaging for shipment than those constructed prior to my invention.

A principal object of the invention is the provision of a fly trap composed of two readily supportable parts, all of which may be compactly nested with other like parts for shipment.

A further object of the invention is the improvement in the general construction of such traps, the invention aiming to produce a trap light in weight, of simple and durable construction, and at low cost.

Other objects and advantages of the invention will be apparent as it is better understood from the following description when considered in connection with the accompanying drawing illustrating a preferred embodiment thereof.

On the drawings,

Figure 1 is a side elevation of a fly trap embodying my invention;

Fig. 2 is an enlarged partial section of the same; and

Fig. 3 is a section taken centrally of the lower portion of the trap shown in Fig. 1.

The fly trap embodying my invention and shown on the drawings consists primarily of an outer cage 4 and an inner open top screen cone 5. The cage 4 is formed of a metal framework 6 consisting of inclined uprights or frame pieces 7 connected at their tops to a metal head piece 8 and at their bottoms to a rigid band 9. The cage is circular in cross section and its wall is formed of a screen 10 in the usual manner, this screen being secured at the top to the cap and at the bottom to the band 9. The band 9 is of U-shape form and the lower edge 11 of the screen extends into the U where it is held by mashing together the upwardly extending portions 12 of the band.

The inner cone 5 is a layer of screening and is open, as has already been intimated, at its top at 13. The cone is secured to a closing plate or disk 14 at its bottom, this plate being provided with a downwardly extending flange 15 adapted to frictionally engage within the band 9, a stiffening false wire edge 16 being provided if desired. The connection between the cone and the disk 14 is effected by disposing the lower edge of the screening 17, forming the cone between an upwardly extending flange 18 of the disk and a metal member or ring 19 having an outwardly extending flange 20. The body of the ring 19 and the flange 18 are parallel and closely fit the screening 17. After the lower edge of the screen has been inserted between the flange 18 and the ring 19, the three parts thus in position are grooved outwardly with any suitable instrument, as at 21, to secure them together.

The frusto conical shape of the cage permits nesting of the cages of a number of traps. Outwardly extending elements 22 are provided upon opposite uprights 7 to limit the nesting movement, the elements of one cage being adapted to engage the band 9 of the next succeeding one, so that they may not be jammed when nested.

It will be manifest that such an arrangement is not necessary when it is desired to nest the inner open top cones, as the greater inclination, which may be observed from the drawing, permits these cones to be readily separated and jamming is substantially impossible.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:—

1. A fly trap having an outer reticulated cage of frusto-conical shape, circular bands to which the ends of said cage are attached, longitudinal and inclined members attached to the outer sides of said bands; and outwardly extending elements attached to said inclined members near the larger end of the cage for engagement by the larger band of another similar cage when nested thereabout.

2. A fly trap comprising an outer reticulated cage, a sheet metal band of U-shape embracing the lower edge of said cage, a flange engaging frictionally within said band and having an inwardly extending closing plate formed with an upwardly extending flange, an inner ring arranged within said flange and having an outwardly extending flange engaging beneath said closing plate, and a reticulated inner open-topped cone having its lower edge embraced between said upwardly extending flange and said ring.

Signed in the presence of two subscribing witnesses.

CHARLES STOLLBERG.

Witnesses:
L. A. BREEDE,
M. BLANK.

Copies of this patent may be obtained for five cents each, by addressing the "Commissioner of Patents, Washington, D. C."